Aug. 18, 1936.  G. WEBB  2,051,233
DISHWASHING MACHINE
Original Filed March 18, 1932  3 Sheets-Sheet 2
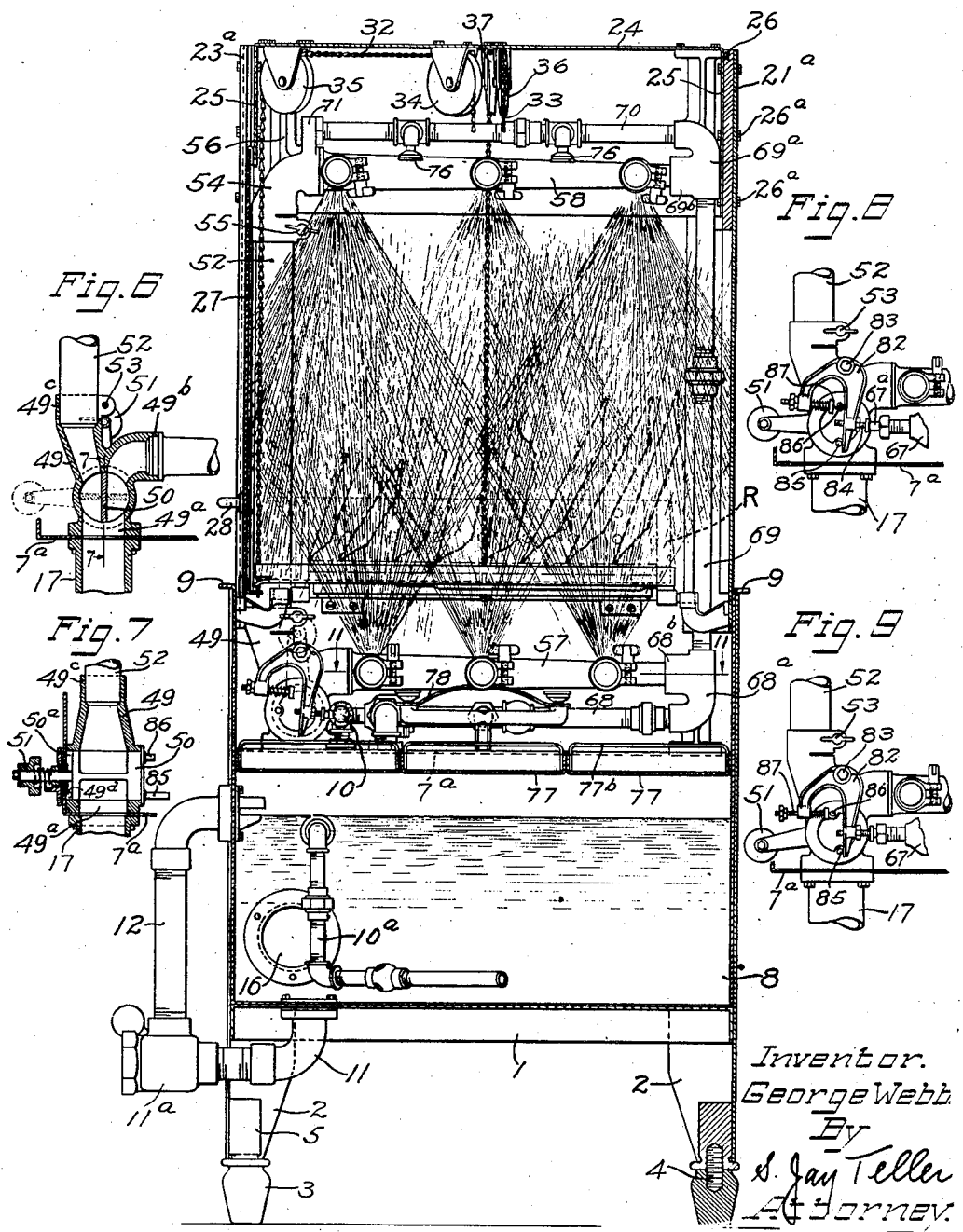

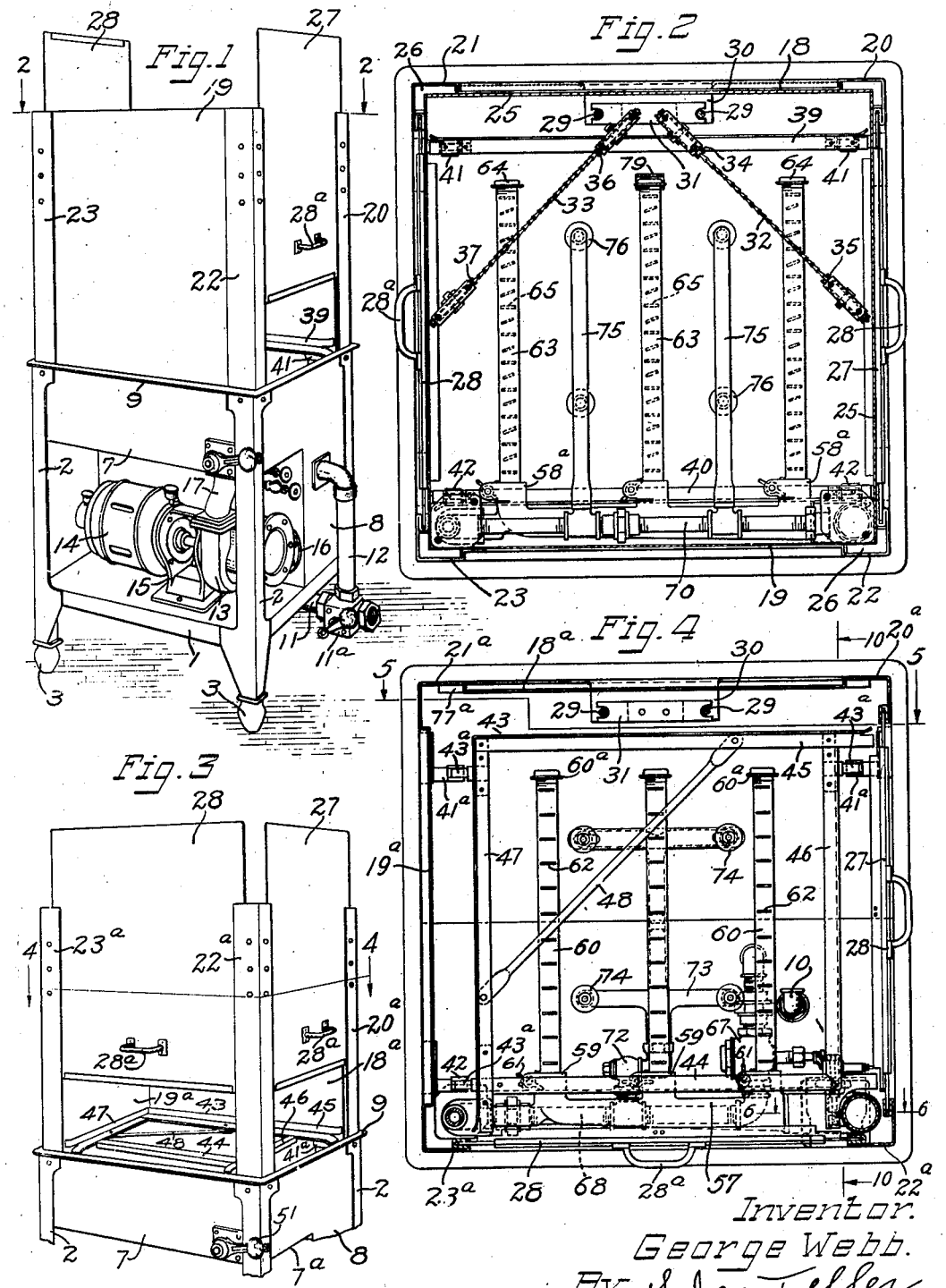

Aug. 18, 1936.  G. WEBB  2,051,233
DISHWASHING MACHINE
Original Filed March 18, 1932  3 Sheets-Sheet 3
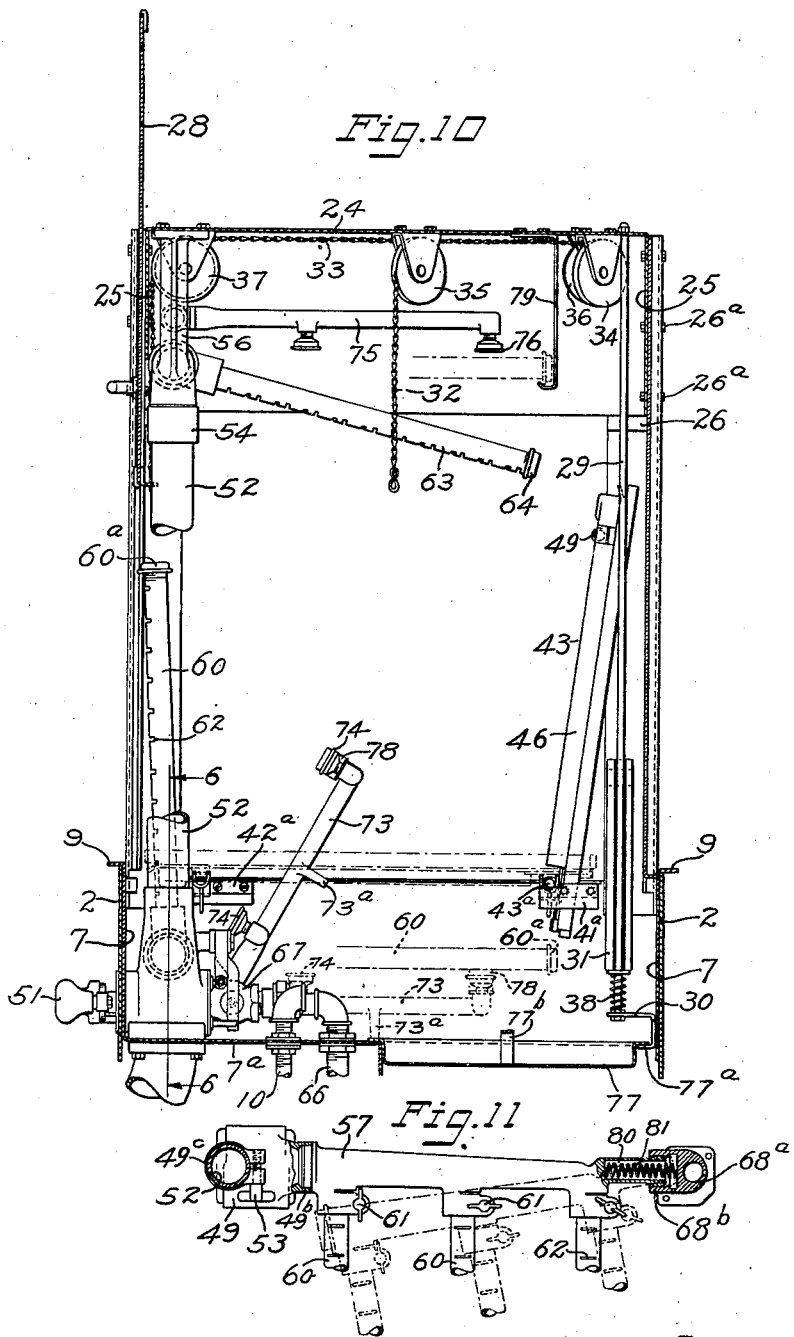
Inventor.
George Webb.
By S. Jay Teller
Attorney.

Patented Aug. 18, 1936

2,051,233

UNITED STATES PATENT OFFICE 2,051,233

DISHWASHING MACHINE

George Webb, West Hartford, Conn., assignor to Colt's Patent Fire Arms Manufacturing Co., Hartford, Conn., a corporation of Connecticut Application March 18, 1932, Serial No. 599,747
Renewed February 18, 1936

9 Claims. (Cl. 141—9)

The invention relates particularly to a dish washing machine of the type wherein the dishes to be washed are first placed in a movable rack, which rack is then held in a stationary position in the washing machine casing while the dishes are being treated or acted upon by the washing liquids.

One of the objects of the invention is to provide an improved arrangement of spray devices which reduces the amount of splash and spray.

A further object of the invention is to provide an arrangement of spray devices and supply pipes therefor which is simple and inexpensive, which can be easily assembled or disassembled and which is rigidly connected with the main casing.

A still further object of the invention is to provide a manifold for the spray devices which is so connected and mounted that it can be readily removed.

A still further object of the invention is to provide an improved valve mechanism for alternately supplying liquids to the washing spray devices and the rinsing spray devices.

Other objects of the invention will be apparent from the following specification and claims.

I do not herein claim those features of invention which relate to the framework and casing of the machine, as these are set forth and claimed in my copending application for Framework and casing for dish washing machine, Serial No. 17,306 filed April 19, 1935, as a division of this present application.

In the accompanying drawings I have shown the embodiment of the invention which I now deem preferable, but it will be understood that the drawings are intended for illustrative purposes only and are not to be construed as limiting or defining the scope of the invention, the claims forming a part of this specification being relied upon for that purpose.

Of the drawings:

Fig. 1 is a perspective view of a washing machine embodying the invention and so constructed that the doors are at opposite sides.

Fig. 2 is an enlarged horizontal sectional view taken along the line 2—2 of Fig. 1, most of the parts in the lower portion of the machine below the upper spray devices being omitted.

Fig. 3 is a fragmentary perspective view similar to Fig. 1, but showing the machine so constructed that the doors are at adjacent sides.

Fig. 4 is an enlarged horizontal sectional view taken along the line 4—4 of Fig. 3, the parts in the lower portion of the machine below the lower spray devices being omitted.

Fig. 5 is a vertical sectional view taken along the line 5—5 of Fig. 4, the doors being closed.

Fig. 6 is a fragmentary vertical sectional view taken along the line 6—6 of Fig. 4.

Fig. 7 is a fragmentary vertical sectional view taken along the line 7—7 of Fig. 6, but showing the valve in closed position.

Figs. 8 and 9 are fragmentary views similar in part to Fig. 5, but showing the valve mechanism in different positions.

Fig. 10 is a vertical sectional view taken along the line 10—10 of Fig. 4, the doors being open.

Fig. 11 is a fragmentary plan view partly in elevation and partly in section along the line 11—11 of Fig. 5.

As shown in the drawings, particularly Fig. 1, the machine is rectangular, being approximately square. The main framework of the machine comprises a base plate 1 and four uprights 2, 2 which are located at the corners of the base plate 1. The base plate and the uprights are preferably formed of sheet metal. Feet 3, 3 are provided at the lower ends of the uprights, and preferably, as shown in detail in Fig. 5, each of them is adjustable, being connected with the corresponding upright 2 by means of a threaded stud 4 which extends into a block 5 secured to the said upright. It will be understood that by adjusting one or more of the feet 3 on the corresponding stud 4 adjustment may be made for irregularities in the floor.

The lower casing of the machine is represented at 7, this being constructed of sheet metal. The lower portion of the said casing 7 is relatively narrow as indicated at 8, this narrower portion constituting a reservoir for the cleaning liquid which is to be used. The upper portion of the casing 7 extends the entire width of the machine and fits between the four uprights 2, 2. This upper portion has a bottom wall 7ᵃ. The upper edge portions of the walls of the lower casing are bent outward to form a narrow flange or ledge 9 positioned above the tops of the uprights 2, 2 and extending entirely around the machine.

Additional water may be admitted to the reservoir 8 through a pipe 10. For heating the liquid in the reservoir 8 there may be provided a gas heater or an electric immersion (neither of which is shown), or heating may be effected by means of steam admitted through a pipe 10ᵃ. Connected with the reservoir 8 at the bottom thereof is a drain pipe 11 controlled by a valve 11ᵃ and there is also an overflow pipe 12 connected with the reservoir 8 at a higher elevation.

Mounted on the base plate 1 at one side of the reservoir 8 is a centrifugal pump 13 and an electric driving motor 14 therefor. Preferably and as shown the said pump and motor are both carried by a single supporting casting 15. The intake of the pump is connected with the reservoir 8 as indicated at 16 and the outlet pipe 17 of the pump extends upward and is connected with the spray devices of the machine in the manner to be hereinafter set forth in detail.

The lower portion of the upper casing of the machine fits within the upper portion of the lower casing 7, as clearly shown in Figs. 5 and 10. The said upper casing comprises two vertical metallic sheets which constitute two side walls and which are bent to form four corner structures, and it also comprises a suitable sheet metal top member or plate.

In the construction shown in Figs. 1 and 2 the two vertical metallic sheets are similar to each other, the said sheets respectively forming side walls 18 and 19 and the said sheets being bent to form two outward offset corner structures, these being respectively marked 20, 21 and 22, 23. The metal constituting these corner structures is additionally bent to form vertical door receiving grooves, the said corner structures 20 and 22 providing one pair of oppositely disposed grooves, and the corner structures 21 and 23 providing another pair of oppositely disposed grooves. The upper casing also comprises a sheet metal top member 24 which is formed with four depending side flanges 25, 25, two of which engage the inner surfaces of the corresponding side walls 18 and 19, and the other two of which form the side walls of the casing above the door openings, as shown for instance at the left side of Fig. 5. Preferably filler pieces 26, 26 are provided in the upper portions of the several corner structures, and bolts 26ª, 26ª hold the several parts together as shown in detail in the upper right hand portion of Fig. 5. These bolts extend through each flange 25, through the corresponding filler piece 26 and through the corresponding corner structure.

The casing structure which has been described makes it possible to provide two doors at opposite sides of the machine so that the dish racks can be pushed straight through. It is sometimes desirable, however, to provide a machine which can be placed in the corner of a room, the dish racks being inserted through an opening in one wall and then removed through an opening in an immediately adjacent wall. A machine constructed in accordance with the principles which have been described can easily be assembled either for straightaway use or for corner use as may be desired. When a machine for corner use is to be constructed, as shown in Figs. 3 and 4, the upper casing construction is substantially the same as that already described, with the single exception that the two vertical metallic sheets constituting the walls of the casing are so constructed that one of the sheets form two immediately adjacent side walls 18ª and 19ª and three corner structures 20ª, 21ª and 23ª, and the second vertical metallic sheet forms only the fourth corner structure 22ª. The top member 24 is constructed and connected exactly as already described. It will be observed that the corner structures 20ª and 22ª provide one pair of door receiving groves, and that the corner structures 22ª and 23ª provide the other pair of door receiving grooves.

Two similar doors 27 and 28 are provided. With the straightaway construction as shown in Figs. 1 and 2, the door 27 is vertically movable in the grooves in the corner structures 20 and 22, and the door 28 is vertically movable in the grooves in the corner structures 21 and 23. Each door is provided with a handle 28ª by means of which it can be conveniently moved. Adjacent the rear wall 18 of the casing there are mounted two vertical guide rods 29, 29, these being supported at the bottom by means of a bracket 30 and being supported at the top in the top member 24. A counter-weight 31 is vertically movable along the guide rods 29, 29 and this counter-weight is connected with horizontal flanges near the bottom of the two doors 27 and 28 by means of chains 32, 33 which extend respectively over pulleys 34, 35 and 36, 37. With this counter-weight construction both doors can be moved simultaneously by means of the handle on either one of them. When upward pressure is applied to either door the counter-weight will move downward and cause both doors to move upward at the same speed. Similarly, when downward pressure is applied to either door, the counter-weight is raised and both doors move downward at the same speed. Preferably a spring 38 is provided which constitutes a resilient stop to limit the downward movement of the counter-weight.

When the doors are arranged as shown in Figs. 3 and 4 the counter-weight construction is exactly the same except that the pulleys 36 and 37 are differently located, as shown in Figs. 5 and 10, to correspond to the different position of the door 28.

When the machine is constructed as shown in Figs. 1 and 2 there are provided two parallel rails 39 and 40 which serve as a dish support, these rails being spaced to receive and guide a suitable rectangular dish rack which may be of any usual or preferred construction. These rails are removably supported on brackets 41, 41 and 42, 42 projecting inward from the walls of the lower casing 7.

When the machine is constructed as shown in Figs. 3 and 4, brackets 41ª, 41ª are provided in lieu of the brackets 41, 41, and the right hand bracket 42 is omitted. A dish support 43 is provided which is adapted to be held in part by the said brackets 41ª, 41ª and 42 and in part by the valve bracket hereinafter described. This dish support comprises parallel rails 44 and 45, the rail 45 being flanged, and it further comprises parallel rails 46 and 47, the rail 47 being flanged. A diagonal brace 48 may also be provided. It will be apparent that a rectangular dish rack can be inserted through the door opening at the right and removed through the door opening at the front, or can be inserted through the door opening at the front and removed through that at the right. The engagement of the dish support 43 with the brackets 41ª, 41ª is by means of trunnions 43ª, 43ª and if desired the entire dish support 43 may be swung upward about these trunnions to the position shown by full lines in Fig. 10.

Provision is made for directing sprays of washing liquid against the dishes from the top and from the bottom. I will now describe the spray devices and their associated parts as I preferably construct them.

Secured to the wall 7ª of the lower casing 7, as shown most clearly in Figs. 6 and 7, is a valve body 49 which is in the form of a T-bracket having a single inlet opening at 49ª and two outlet openings at 49ᵇ and 49ᶜ. The before-mentioned outlet pipe 17 leading from the pump communicates with the valve body at the inlet opening 49ª thereof. Rotatably mounted within the valve body 49 is a valve element 50 which can occupy either an open position as shown by full lines in Fig. 6 or a closed position as shown by dotted lines. It will be clear that when the valve element 50 is in its open position liquid can freely pass through both branches of the valve body to the outlet openings at 49ᵇ and 49ᶜ. When the valve is closed no liquid can pass, and the pump 13 operates idly without discharging any liquid. A handle 51 is provided at the front of the machine for operating the valve element 50, suitable means being provided for limiting the motion of the said handle. By means of this handle the valve can be moved to open or closed position as desired.

It will be understood that the pump continues to run when the main valve is closed, the valve being thus continuously subjected to pressure from below. In the event of any leakage there would be a tendency for pressure to be built up in the chamber 50ª adjacent the stuffing box. As the result of pressure in the said chamber 50ª there would be a tendency for liquid to seep through the stuffing box causing an objectionable moisture on the exterior of the machine. To avoid this the valve body 49 is provided with a relief opening 49ᵈ which permits drainage from the chamber 50ª into the interior of the main casing of the machine.

Connected with the valve body at 49ᶜ is a vertical supply pipe 52 which is preferably clamped in place by means of a screw 53. Connected with the upper end of the supply pipe 52 is an elbow 54, the pipe being clamped in this elbow by means of a screw 55. The elbow 54 is preferably in the form of a bracket having an extension 56 which is secured to the top element 24 of the casing as clearly shown in Fig. 10. The pipe 52 and the elbow 54 constitute a vertical conduit for the washing liquid.

Connected respectively with the valve body or T-bracket 49 and with the elbow 54 are two manifolds 57 and 58 which are similar, though not identical in construction. As shown most clearly in Fig. 4 the lower manifold 57 is provided with horizontally projecting hollow bosses 59, 59 which are slotted to permit spray devices or pipes 60, 60 to be clamped therein by means of screws at 61, 61. The pipes 60, 60 are closed at their outer ends by means of caps 60ª, 60ª and they are provided with regularly spaced slots 62, 62 for providing upwardly directed fan-shaped sprays of liquid as clearly shown in Fig. 5. The upper manifold is similarly provided with horizontally extending hollow bosses 58ª, 58ª as clearly shown in Fig. 2, these serving to hold horizontal spray devices or pipes 63, 63. These pipes are closed at their outer ends by means of caps 64, 64 and are provided with slots 65, 65 through which fan-shaped sprays are directed downward against the dishes, as clearly shown in Fig. 5.

It will be observed that the two outer spray pipes 60, 60 are out of vertical register with the two outer spray pipes 63, 63, this arrangement being distinctly advantageous for the reason that the upper and lower sprays which are or may be adjacent the doors do not directly oppose each other. The slight offset of one spray with respect to the other not only results in greater washing efficiency, but also considerably reduces the amount of splash. If the doors should inadvertently be opened with the sprays in operation the amount of splash through the doors would be considerably less with my improved arrangement than it would be if the upper and lower sprays were in exact vertical register with each other.

Preferably I also provide separate spray devices for directing rinsing liquid against the dishes. Extending through the wall 7ª is a pipe 66 adapted to be connected with a suitable external source of hot rinsing water. The pipe 66 is connected with a valve 67 which is of the type normally closed by a spring and having a horizontally projecting stem, such as 67ª, which can be pressed to effect opening. From the valve 67 a manifold 68 extends transversely of the machine underneath the manifold 57 to an elbow bracket 68ª which is secured to the wall 7ª. A vertical supply pipe 69 extends from the elbow bracket 68ª to a second similar elbow bracket 69ª secured to the top member 24. The pipe 69 and the elbow 69ª constitute a vertical conduit for the rinsing liquid. A manifold 70 extends transversely from the elbow bracket 69ª above the manifold 58, being supported at the opposite end in a lug 71 on the elbow bracket 54. A T is included in the manifold 68 and adjacent this T there is a swivel connection 72 to which is secured a rinse distributor 73. The distributor 73 has a main stem and four branches, and rinse spray nozzles 74, 74 are mounted at the ends of the branches, being adapted to provide upwardly directed conical rinse sprays. Two Ts are included in the manifold 70 and to these are connected rinse distributors 75, 75, each having two rinse nozzles 76, 76 adapted to provide downwardly directed conical rinse sprays.

Preferably the two elbow brackets 68ª, 69ª are provided with bosses 68ᵇ and 69ᵇ which serve respectively to support the ends of the manifolds 57 and 58. It will thus be apparent that I have provided two vertical supply pipes 52 and 69 which are spaced apart in the casing, one of the pipes 52, being connected with the pump and the other of the pipes, 69, being connected with means for supplying the rinsing liquid. It will also be apparent that at the top of the machine there are two horizontal manifolds 58 and 70 each mechanically connected with both supply pipe structures but one receiving liquid from one pipe and the other receiving liquid from the other pipe. Each supply pipe structure is rigidly held in place inasmuch as it is connected directly with the bottom wall 7ª and with the top element 24. To these two rigid supply pipe structures there are connected two pairs of horizontal manifolds, one pair at the top and one pair at the bottom, all but one of the manifolds being mechanically connected with both supply pipe structures and each of the manifolds receiving liquid from its proper supply pipe. It will thus be seen that I have provided a simple and strong liquid supply and distribution system which is rigidly held in place in the casing and which by reason of its position and manner of connection serves as a reinforcement means for the casing.

The liquid from the several sprays falls downward into the lower casing 7, some of it passing directly into the reservoir 8 and some of it being caught by the wall 7ª and then passing into the reservoir 8. In order to prevent the larger solid particles that may be removed from the dishes from passing into the reservoir and from being re-circulated by the pump, I preferably provide screens or scrap trays 77, 77 at the top of the reservoir. These are preferably removable being supported at the front on the wall 7ª and being supported at the rear on a flange 77ª. This flange 77ª may be formed integrally with the before-mentioned flange 30 which supports the guide rods for the counter-weight. These screens may be formed of woven wire or of perforated metal. For convenience in handling each of them preferably has a handle 77ᵇ.

Preferably the main spray devices 60 and 63 with their manifolds are pivotally mounted as indicated in Fig. 10. The lower rinse spray distributor 73 is also pivoted, being connected by means of the swivel device 72 as already described. The swivelling of the main spray devices makes it possible for the spray pipes 60 and 63 to be more easily removed from their manifolds for inspection and cleaning. The pivoting of the lower main spray devices 60 and of the rinse spray distributor 73 facilitates removal of the screens or scrap trays 77. Such removal is further facilitated by removing the rail 40 of the straightaway construction or by tilting the dish support 43 of the corner construction, such dish support 43 being shown in tilted position in Fig. 10. The distributor 73 is provided with a foot 73ª by means of which it is supported in its normal position, and the said distributor 73 preferably carries a spring 78, shown in Fig. 5, which spring serves to resiliently support the pipes 60 in their normal horizontal positions. The pipes 63 are normally held in their normal horizontal positions by means of a spring latch 79 depending from the top member 24.

Preferably the manifolds 57 and 58 are not only pivoted, but are so mounted that they can be readily removed. In Fig. 11 I have shown in detail the construction which permits removal of the manifold 57 and it will be understood that the manifold 58 is or may be similarly constructed. The right hand end of the manifold 57 is provided with a recess 80 in which is located a coil compression spring 81, which spring abuts against the inner end of the recess in the boss 68ᵇ. The end of the manifold 57 which enters the said recess in the boss is provided with a spherical surface which permits the manifold to be tilted through a limited angle. Normally the spring 81 presses the left hand end of the manifold 57 against the valve bracket 49ᵇ, the parts being closely fitted to provide a tight joint. When it is desired to remove the manifold and the pipes connected therewith the said manifold is pressed toward the right in opposition to the pressure of the spring 81, being moved far enough to permit the left hand end of the manifold to be withdrawn from the valve bracket 49. Then the manifold is swung toward the center of the machine and then withdrawn endwise from the recess in the bracket 68ª.

I have already stated that the valve 50 is operated by means of the handle 51. I preferably provide means whereby this same handle serves also to operate the valve 67. For this purpose there is provided a yoke 82 which is horizontally pivoted on the valve bracket 49 at 83. Threaded into the yoke 82 is a stud 84 which is adapted to engage the stem 67ª of the valve 67. Projecting endwise from the rotary valve element 50 are two pins 85 and 86, one of which is adapted to engage the right hand arm of the yoke 82 and the other of which is adapted to engage a spring pressed plunger 87 carried by the left hand arm of the yoke 82.

Fig. 8 shows the parts in their normal positions with both valves closed. When the operator desires to admit liquid from the pump to the main wash sprays the handle 51 is raised to the position shown in Figs. 5 and 6. This movement carries the pins 85 and 86 entirely out of engagement with the yoke 82 and the valve 67 therefore remains closed. When it is desired to subsequently admit water to the rinse spray devices the handle is first restored to the normal or neutral position shown in Fig. 8 and then moved beyond that position to that shown in Fig. 9. The pin 85 moves the yoke 82 in the counter-clockwise direction, thus pressing the stud 84 against the valve stem 67ª and opening the valve 67. At the same time the pin 86 presses against the spring plunger 87 and compresses the spring thereof. The rinse valve thus remains open so long as the handle is pressed downward, but as soon as the pressure is removed from the handle the spring plunger 87 reacts upon the pin 86 and restores the parts to the normal position shown in Fig. 8.

It will be observed that the two pins 85 and 86 are oppositely disposed with respect to the axis of the valve and that they thus serve to prevent unequalized pressure upon the valve. It will be apparent that if the pin 86 were omitted the reaction from the eccentric pressure exerted from the pin 85 would tend to throw the valve out of its normal central position, thus causing excessive friction and binding. This unbalanced force with its necessarily detrimental results is eliminated by providing the pin 86 in a position opposite to the pin 85.

The operation of the machine will be apparent from the foregoing description, it being understood that the reservoir 8 contains a supply of liquid at a suitable temperature and with a suitable detergent therein, and that a supply of hot rinse water is available through the pipe 66. Tables of suitable height are preferably placed adjacent the doors. With the straightaway machine, as shown in Figs. 1 and 2, the doors are opened and a dish rack such as R filled with dishes is pushed in through one opening, as for instance that at the right. The doors are then closed and the washing operation is started by moving the valve 51 to its vertical position. Assuming the pump to be in operation, sprays are simultaneously directed upward and downward against the dishes, the washing liquid being returned by gravity through the screens or scrap trays 77 into the reservoir 8. The washing liquid is withdrawn by the pump and returned to the sprays and is thus constantly circulated. After the washing action has been continued for a sufficient length of time the handle 51 is returned to its normal position and then pressed downward to the position shown in Fig. 9, thus stopping the washing action and admitting water to the rinse nozzles. The rinse water is hot, preferably being at or near the boiling point and it serves not only to remove any loose particles that may not have been removed by the wash sprays but it also serves to heat the dishes so as to sterilize them and enable them to dry very quickly. After the conclusion of the rinsing operation the handle 51 is automatically returned to its normal position, thus stopping the rinsing action. The doors are then opened and the rack is removed, ordinarily through the opposite door, that is, the door at the left. When a number of racks of dishes are to be washed successively each rack after the first may be used to push out the preceding rack.

With the corner machine constructed as shown in Figs. 3 and 4 the operation is exactly the same as that described with the single exception that the dish racks are entered and removed through doors in adjacent sides of the machine. It will be obvious that with this arrangement one rack cannot be used to push out another.

What I claim is:

1. A dish washing machine comprising in combination, a tank for containing washing liquid, a casing, a dish support in the casing, a pump for withdrawing liquid from the tank and delivering it under pressure, means for supplying rinsing liquid, two vertical pipes spaced apart within the casing, one being connected with the pump and the other being connected with the means for suplying rinsing liquid, two elbow brackets connected to the respective pipes at their upper ends, two horizontal manifolds extending between the said brackets and each connected at one end with the elbow of the corresponding bracket, each manifold being additionally supported at its opposite end by means of the adjacent bracket, and two sets of spray devices located adjacent the dish support and connected respectively with the two manifolds.

2. A dish washing machine as set forth in claim 1, wherein one manifold and the spray devices connected therewith are pivotally movable about the longitudinal axis of the manifold.

3. A dish washing machine as set forth in claim 1, wherein each elbow bracket is directly secured to a wall of the casing.

4. A dish washing machine comprising in combination, a tank for containing washing liquid, a casing having a top wall and a bottom wall, a dish support in the casing, two vertical pipes spaced apart within the casing, a T-bracket and an elbow bracket connected to the respective pipes at their lower ends and rigidly secured to the bottom wall of the casing, two elbow brackets connected to the respective pipes at their upper ends and rigidly secured to the top wall of the casing, a pump for withdrawing liquid from the tank and delivering it under pressure through the said T-bracket to the corresponding pipe, means for supplying rinsing liquid to the other pipe, two pairs of horizontal manifolds extending respectively between the said lower and between the said upper brackets and each connected at one end with the corresponding bracket to receive liquid therefrom, and four sets of spray devices located adjacent the dish support and connected respectively with the said manifolds.

5. A dish washing machine as set forth in claim 4, wherein some of the manifolds are additionally suported by means of the respective brackets opposite the brackets through which they receive liquid.

6. A dish washing machine as set forth in claim 4, wherein at least two manifolds and the corresponding spray devices are pivotally movable about the longitudinal axes of the respective manifolds.

7. In combination in a dish washing machine, a tank for containing washing liquid, a casing, a dish support in the casing, a pump for withdrawing washing liquid from the tank and delivering it under pressure, a supply pipe connected to receive liquid from the pump, a horizontal manifold detachably engaging at one end with the supply pipe to receive liquid therefrom and having an integral extension at the opposite end, a set of spray devices adjacent the dish support and connected with and carried by the manifold, a hollow support into which the manifold extension projects and with which it is detachably engaged, the said suport permitting longitudinal movement of the manifold and manifold extension so that the former may be disengaged from the supply pipe and the latter then disengaged from the support and a spring engaging the support and the manifold extension and normally holding the manifold in engagement with the supply pipe.

8. A machine for washing dishes comprising in combination, a tank for containing washing liquid, a casing, a dish support in the casing, a pump for withdrawing liquid from the tank and delivering it under pressure, means for supplying rinsing liquid, two sets of spray devices located adjacent the dish support, piping connecting the pump with one set of spray devices, piping connecting the rinse supply with the other set of spray devices, a manually operable rotary valve in the first said piping, a normally closed stem operated valve in the second said piping, and a pivoted lever actuated by the first said valve and engaging the said stem to move it longitudinally so as to open the second valve when the first valve is near its closed position.

9. A dish washing machine as set forth in claim 8, wherein there is a spring controlled plunger on the lever, and wherein there are two oppositely disposed pins on the rotary valve, one pin engaging the lever to move it in the direction to open the second valve and the other pin simultaneously engaging the spring plunger to tension the spring.

GEORGE WEBB.